T. A. RANDALS.
NUT LOCK.
APPLICATION FILED MAR. 17, 1921.
1,426,319.                                              Patented Aug. 15, 1922.
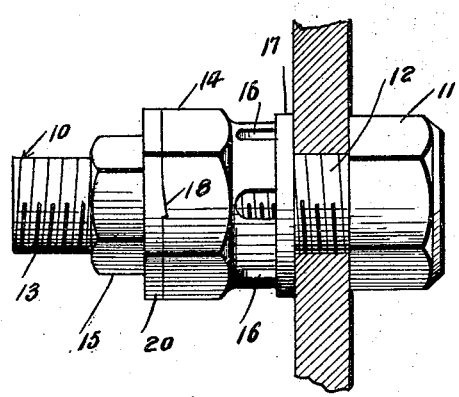
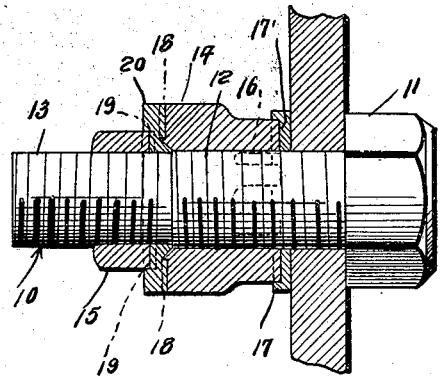
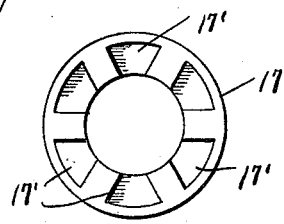
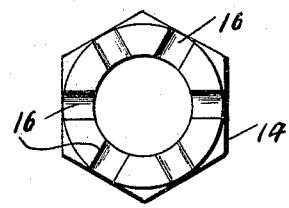
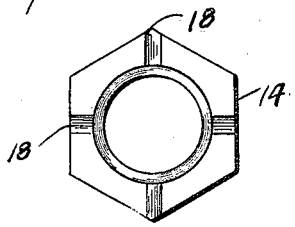
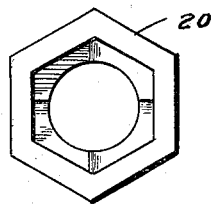
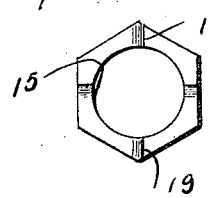
Inventor
T. A. Randals
By [signature], Attorney

UNITED STATES PATENT OFFICE.

TULLUS A. RANDALS, OF PECOS, TEXAS.

NUT LOCK.

1,426,319.  Specification of Letters Patent.  Patented Aug. 15, 1922.

Application filed March 17, 1921. Serial No. 452,920.

*To all whom it may concern:*

Be it known that I, TULLUS A. RANDALS, a citizen of the United States, residing at Pecos, in the county of Reeves and State of Texas, have invented certain new and useful Improvements in a Nut Lock; and I do hereby declare the following to be a full, clear, and exact description of the invention, such as will enable others skilled in the art to which it appertains to make and use the same.

The object of the invention is to provide a simple and relatively inexpensive nut lock or bolt and nut wherein the nut is secured against accidental displacement by jarring or vibration and is therefore suitable for use in connection with machinery, railway ties and fish plates and the like; and with this object in view the invention consists in a construction and combination of parts of which a preferred embodiment is shown in the drawing, wherein:

Figure 1 is a side view of a bolt and nut locking means embodying the invention.

Figure 2 is a longitudinal sectional view of the same.

Figure 3 is a face view of the main nut washer.

Figure 4 is an inner face view of the main nut.

Figure 5 is an outer face view of the main nut.

Figure 6 is a detail view of the locking or jam nut washer.

Figure 7 is an inner face view of the locking or jam nut.

The bolt 10 having the usual or any preferred form of head 11 is provided with a right hand threaded portion 12 and a slightly reduced left hand threaded portion 13, a main nut 14 being threaded upon the body portion of the bolt and a locking or jam nut 15 being fitted upon the reduced or left hand threaded portion thereof.

The inner side of the main nut is preferably kerfed as indicated at 16 for engagement with a washer 17 preferably of lead or other soft material which is interposed between said nut and the object which is being secured by the bolt, so as to be compressed and in order that the projections of the nut between the kerfs may become embedded in the surface of the washer to form seats 17 as indicated in Figure 3.

The outer side of the main nut and the inner side of the locking or jam nut are roughened or provided with shoulders 18 and 19 between which it is preferable to arrange a soft metal washer 20 so that the opposing surfaces of said nuts may engage the washer to lock the parts against independent movement except when severely strained as by the use of a wrench of considerable leverage being applied to the locking or jam nut, it being obvious that the tendency of the main nut to unscrew by reason of jarring or vibration will serve to tighten the outer or locking nut which is threaded in the reverse direction upon the bolt.

Having thus described the invention, what I claim is:—

A nut lock including a bolt having right and left hand screw threaded portions, nuts threaded on said portions, washers of soft material on said bolt between the nuts and between the end of one nut and the object to which the bolt is applied, and spaced projections formed on both ends of one nut and on one end of the other nut and adapted to bite into said washers when the nuts are turned towards each other.

In testimony whereof I affix my signature in presence of two witnesses.

TULLUS A. RANDALS.

Witnesses:
JNO. B. HOWARD,
M. L. VICKERS.